Patented Nov. 21, 1939

2,180,335

UNITED STATES PATENT OFFICE 2,180,335

PROCESS FOR HARDENING ALBUMINOUS SUBSTANCES

Johannes Brunken, Dessau, Anhalt, Germany, assignor, by mesne assignments, to Agfa Ansco Corporation, Binghamton, N. Y., a corporation of Delaware No Drawing. Application July 16, 1937, Serial No. 154,041. In Germany July 28, 1936

7 Claims. (Cl. 95—7)

My present invention relates to a process for hardening albuminous substances and more particularly to the hardening of photographic gelatin layers by means of hydroxy-ketones.

In photographic practice there have been used for the hardening of layers containing gelatin, salts of polyvalent metals, particularly aluminium or chromium salts, and aldehydes. Among the aldehydes there have been used or proposed for use formaldehyde, glyoxal, acrolein, dibromacrolein, hydroxyaldehydes and hydroxyaldehydeketones. As compared with aldehydes ketones have only very indifferent properties in respect of hardening gelatin layers. It has been proposed, therefore, to use diketones for hardening photographic emulsion layers, but even these are of little effect as compared with the aldehydes. For instance, when diacetyl is used there is required for producing an equal amount of hardening 16 times the molecular proportion of diacetyl for one of glyoxal.

It is an object of the present invention to provide a process by which albuminous substances may be hardened by means of hydroxy-ketones not containing an aldehyde group.

A further object is to provide a novel hardening agent for gelatin emulsions for photographic purposes. Further objects will be apparent from the detailed specification following hereafter.

This invention is based on the observation that a ketone not containing an aldehyde group which has no sufficient hardening action may be converted into a very active hardening agent by introducing into its molecule one or more hydroxygroups. For example dihydroxy-acetone is a hardening agent the effect of which is equal to that of the best of the aldehydes. Thus dihydroxyacetone, for example, yields a melting point of the gelatin similar to that which is obtained by using glyoxal in equivalent proportion.

In principle all hydroxy-ketones whether aliphatic, aromatic or of the sugar group have been found to yield good results. It is possible to vary the strength of the hardening agent by selecting differently substituted hydroxyketones.

As a general rule it may be said that the hardening effect of a hydroxyketone decreases with the increase in the number of carbon atoms in the molecule of the ketone. On the other hand the effect is increased, if a ketone containing in its molecule a plurality of hydroxy groups is used.

For example, if the ketone contains only one hydroxy-group the hardening effect is somewhat smaller than when there are two such groups. Dihydroxy-acetone, therefore, hardens more strongly than acetol does.

As examples especially suitable for the purpose of the present invention there may be named the following compounds:

Acetol, dihydroxyacetone, p-hydroxybenzoylcarbinol, 2.4.6-trihydroxybenzoylcarbinol, 3-ketobutane-1-ol, propionyl-carbinol, 3-keto-pentan-1-ol, hydroxy-methylene-acetone, fructose and sorbinose.

The new hardening agents are applied in photography in the usual manner. Advantageously the new hardening agent may be added to the gelatin solution or to the emulsion shortly before casting or the finished cast layer or even the finished developed layer which may be carried on any desired support, for instance glass, paper, cellulose or a cellulose derivative or metal, may be bathed in the solution of the ketone in question. The proportion of the substituted ketone to be used depends upon the desired melting point of the finished product and amounts in general to 0.05-5 grams of the hardening substance per kilo of gelatin solution of 10 per cent strength. However, this range of proportion does not represent the limit of the possibility in using the hardening agent. It may be added that the application of these new hardening agents is not limited to photographic emulsions or photographic layers, but extends quite generally to gelatin and other albuminous substances which require hardening, for instance albumin, casein, gliadin, whatever the purpose may be; it is immaterial whether the albuminous substance to be hardened has the form of a layer on a support, or is used without a support.

The following examples illustrate the invention:

*Example 1.*—1 kilo of a gelatin jelly of 9 per cent strength is melted at about 40° C. and mixed with an aqueous solution of 360 mg. of dihydroxyacetone while stirring. After casting and drying the gelatin layer has a melting point of 37° C.; on long storage this melting point rises somewhat.

*Example 2.*—1 kilo of aqueous silver halide emulsion containing 8-9 per cent of gelatin is melted and 1800 mg. of fructose are added. After storage for some weeks the layer of emulsion has a melting point of 37° C. whereas that of the unhardened layer is 32° C.

*Example 3.*—An emulsion layer or gelatin layer on a suitable support is bathed for 3-4 minutes in a solution of 2 per cent strength of dihydroxyacetone, the pH-value being about 7. After drying the gelatin layer has a melting point of 38° C., whereas the untreated layer has a melting point of 33° C.

What I claim is:

1. The process of hardening an albuminous substance which consists in treating it with a ketone containing in its molecule at least one hydroxy-group and no aldehyde group.

2. The process of hardening gelatin which consists in treating it with a ketone containing in its molecule at least one hydroxy-group and no aldehyde group.

3. The process of hardening gelatin which consists in treating it with dihydroxy-acetone.

4. The process of hardening gelatin which consists in treating it with p-hydroxybenzoylcarbinol.

5. The process of hardening gelatin which consists in treating it with fructose.

6. In the manufacture of photographic articles provided with a hardened gelatin layer, the step which comprises hardening the gelatin by causing it to react with a ketone containing in its molecule at least one hydroxy group and no aldehyde group.

7. A photographic material provided with a gelatin silver halide emulsion layer, said layer containing the condensation product of gelatin and a ketone containing in its molecule at least one hydroxy group and no aldehyde group.

JOHANNES BRUNKEN.